US012601638B2

(12) United States Patent
Maegawa

(10) Patent No.: US 12,601,638 B2
(45) Date of Patent: Apr. 14, 2026

(54) INFRARED IMAGING DEVICE

(71) Applicant: Mitsubishi Electric Corporation, Tokyo (JP)

(72) Inventor: Tomohiro Maegawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 655 days.

(21) Appl. No.: 17/996,180

(22) PCT Filed: Jun. 2, 2020

(86) PCT No.: PCT/JP2020/021707
§ 371 (c)(1),
(2) Date: Oct. 13, 2022

(87) PCT Pub. No.: WO2021/245772
PCT Pub. Date: Dec. 9, 2021

(65) Prior Publication Data
US 2023/0204428 A1 Jun. 29, 2023

(51) Int. Cl.
*G01J 5/48* (2022.01)
*G06V 10/60* (2022.01)
(Continued)

(52) U.S. Cl.
CPC ................ *G01J 5/48* (2013.01); *G06V 10/60* (2022.01); *H04N 23/11* (2023.01); *H04N 23/23* (2023.01)

(58) Field of Classification Search
CPC ...... G01J 5/24; G01J 5/10; G01J 5/485; G01J 5/48; G01J 5/52; G01J 5/70; G01J 5/90; H04N 25/60; H04N 5/33
(Continued)

(56) References Cited

U.S. PATENT DOCUMENTS 4,879,598 A * 11/1989 Seto .......................... H04N 5/33
348/E5.079
5,994,701 A * 11/1999 Tsuchimoto .............. G01J 5/70
250/252.1
(Continued)

FOREIGN PATENT DOCUMENTS

CN 102569634 A 7/2012
EP 2 901 019 A1 8/2015
(Continued)

OTHER PUBLICATIONS

"Notice of Reasons for Refusal" Office Action issued in JP 2020-567185; mailed by the Japanese Patent Office on Mar. 16, 2021.
(Continued)

*Primary Examiner* — Peter J Macchiarolo
*Assistant Examiner* — Mireille S Sadate-Moualeu
(74) *Attorney, Agent, or Firm* — Studebaker Brackett PLLC

(57) ABSTRACT

This infrared imaging device includes: an infrared transmission lens which collects infrared light emitted from an object; an infrared imaging element having a screen in which pixels for converting infrared light collected by the infrared transmission lens to electric signals are arranged in a two-dimensional array; a signal processing unit which converts electric signals from the infrared imaging element to digital signals; an optical characteristics correction unit which performs optical characteristics correction for an output of the signal processing unit on the basis of non-image-formation information set in advance for the infrared transmission lens; a reference temperature detection unit which detects a reference temperature; and a temperature measurement unit which performs absolute temperature conversion for the object on the basis of an output of the
(Continued)

OUTPUT PIXEL NUMBER (a. u. )

optical characteristics correction unit and an output of the reference temperature detection unit.

12 Claims, 14 Drawing Sheets

(51) Int. Cl.
H04N 23/11 (2023.01)
H04N 23/23 (2023.01)

(58) Field of Classification Search
USPC ....................................... 374/121; 250/338.1
See application file for complete search history.

(56) References Cited

U.S. PATENT DOCUMENTS

| | | | |
|---|---|---|---|
| 2003/0081955 A1 | 5/2003 | Yamamoto | |
| 2005/0046905 A1 | 3/2005 | Aizaki et al. | |
| 2011/0234823 A1 | 9/2011 | Terasawa | |
| 2012/0138799 A1 | 6/2012 | Wakabayashi et al. | |
| 2013/0141590 A1* | 6/2013 | Matsumoto ............ | H04N 23/20 |
| | | | 348/164 |
| 2014/0044374 A1 | 2/2014 | Terasawa | |
| 2015/0326094 A1 | 11/2015 | Cunningham et al. | |
| 2017/0163885 A1 | 6/2017 | Oniki et al. | |

FOREIGN PATENT DOCUMENTS

| | | | |
|---|---|---|---|
| JP | 63235834 A | * | 9/1988 |
| JP | S63-235834 A | | 9/1988 |
| JP | H01-188176 A | | 7/1989 |
| JP | 2001-028713 A | | 1/2001 |
| JP | 2005-072967 A | | 3/2005 |
| JP | 2009281863 A | * | 12/2009 |
| JP | 2011-211426 A | | 10/2011 |
| JP | 2012-213130 A | | 11/2012 |
| JP | 2013-118547 A | | 6/2013 |
| JP | 5755780 B2 | | 7/2015 |
| JP | 2015-216576 A | | 12/2015 |
| JP | 2017-103617 A | | 6/2017 |
| JP | 2019-205057 A | | 11/2019 |
| WO | 2015/030429 A1 | | 3/2015 |

OTHER PUBLICATIONS

"Notice of Reasons for Refusal" Office Action issued in JP 2020-567185; mailed by the Japanese Patent Office on Aug. 3, 2021.

Office Action issued in TW 110108862; mailed by the Taiwan Intellectual Property Office on Jun. 14, 2022.

"Notice of Reasons for Refusal" Office Action issued in JP 2021-079471; mailed by the Japanese Patent Office on Jun. 21, 2022.

International Search Report issued in PCT/JP2020/021707; mailed Sep. 1, 2020.

The extended European search report issued by the European Patent Office on Jun. 21, 2023, which corresponds to European Patent Application No. 20939041.8-1020 and is related to U.S. Appl. No. 17/996,180.

An Office Action; mailed by the China National Intellectual Property Administration of the People's Republic of China on May 14, 2025, which corresponds to Chinese Patent Application No. 202080101433.X and is related to U.S. Appl. No. 17/996,180.

Communication pursuant to Article 94(3) EPC issued by the European Patent Office on Apr. 1, 2025, which corresponds to European Patent Application No. 20939041.8-1001 and is related to U.S. Appl. No. 17/996,180.

An Office Action mailed by China National Intellectual Property Administration on Sep. 29, 2025, which corresponds to Chinese Patent Application No. 202080101433.X and is related to U.S. Patent Application No. 17/996, 180.

An Office Action; mailed by the China National Intellectual Property Administration of the People's Republic of China on May 14, 2025, which corresponds to Chinese Patent Application No. 202080101433.X and is related to U.S. Patent Application No. 17/996, 180.

Communication pursuant to Article 94(3) EPC issued by the European Patent Office on Apr. 1, 2025, which corresponds to European Patent Application No. 20939041.8 - 1001 and is related to U.S. Patent Application No. 17/996, 180.

* cited by examiner

2

INFRARED IMAGING DEVICE

TECHNICAL FIELD

The present disclosure relates to an infrared imaging device.

BACKGROUND ART

In a general thermal infrared solid-state imaging element, pixels having a heat insulation structure are arranged in a two-dimensional array, and an infrared image is taken using changes in the temperatures of the pixels due to entering infrared light. In a case of an uncooled thermal infrared solid-state imaging element, as temperature sensors forming pixels, a bolometer using polysilicon, amorphous silicon, silicon carbide, vanadium oxide, etc., and a sensor using a semiconductor element such as a diode or a transistor, are known. In particular, semiconductor elements such as a diode are formed as a solid or the like, and variations in their electric characteristics and temperature dependencies are very small. Therefore, semiconductor elements are advantageous in making uniform characteristics of pixels.

In the thermal infrared imaging element, current is injected or voltage is applied to the temperature sensor, whereby an electric signal is generated. When infrared light is received, the temperature of the temperature sensor slightly varies, so that the electric signal slightly varies. The variation of the electric signal is amplified and converted to a digital signal which is outputted to the outside.

In general, an infrared imaging device includes the infrared imaging element, a mounting substrate portion for holding the infrared imaging element, optical-system members such as a lens for collecting infrared light to form an image, and a lens tube portion for holding the optical-system members. In addition, parts composed of an application specific integrated circuit (ASIC) board, an integrated circuit (IC), and the like for performing image processing, correction processing, and the like are often mounted to the mounting substrate portion at the same time.

The optical members for collecting infrared light to form an image are generally made of germanium (Ge), chalcogenide glass, silicon (Si), or the like. While a lens can be formed with the chalcogenide glass by sintering, the chalcogenide glass is very high in material cost. In addition, Ge and Si cannot be worked by sintering and therefore need to be worked by cutting, etching, or the like. The above materials are all inferior to a glass lens or a resin lens generally used for visible light, in terms of cost or working accuracy.

Therefore, in a particularly inexpensive infrared imaging device, a spherical lens made of a Si material is generally used, but in this case, an image formation property for infrared light is often not ideal. In particular, in a case of attempting to achieve a wide angle of view and a high sensitivity at the same time, the image formation property tends to be significantly deteriorated. Further, sensitivity variations due to the light amount difference between an optical center part and an outer peripheral part, i.e., a shading component, become significant at the same time.

In addition, in the temperature sensor, the following temperature changes are summed and detected: temperature change of the temperature sensor due to infrared light entering through the optical system from an object, i.e., an actual sensitivity component, self-heat-generation temperature change of the temperature sensor itself due to current injection or voltage application to the temperature sensor, and temperature change due to self-heat-generation by the above parts in the entire infrared imaging device. Therefore, temperature information outputted from the temperature sensor based on the infrared light is not necessarily the above actual sensitivity component alone.

In order to solve the above problem, for example, as disclosed in Patent Document 1, a mechanism for performing correction with a pixel-by-pixel sensitivity correction table prepared in advance has been proposed.

In addition, as disclosed in Patent Document 2, a mechanism for performing correction processing by using a correction table set in advance through digital processing has been proposed. In this case, for example, it is also general to sequentially perform difference processing on the basis of a second temperature sensor for acquiring temperature information of the infrared imaging device and prepared data of output levels acquired in advance and stored for each infrared imaging device.

CITATION LIST

Patent Document

Patent Document 1: Japanese Laid-Open Patent Publication No. 2012-213130
Patent Document 2: Japanese Patent No. 5755780

SUMMARY OF THE DISCLOSURE

Problems to be Solved by the Disclosure

However, in the conventional infrared imaging devices, if an optical lens whose optical characteristics are not ideal is used, there is a problem that image blur due to deterioration of the lens image formation property cannot be corrected.

The present disclosure has been made to solve the above problem, and an object of the present disclosure is to provide an infrared imaging device capable of appropriately correcting image blur due to deterioration of the lens image formation property even in a case of using an optical lens whose optical characteristics are not ideal.

Solution to the Problems

An infrared imaging device according to the present disclosure includes: an infrared transmission lens which collects infrared light emitted from an object; an infrared imaging element having a screen in which pixels for converting the infrared light collected by the infrared transmission lens to electric signals are arranged in a two-dimensional array; a signal processing unit which converts the electric signals from the infrared imaging element to digital signals; an optical characteristics correction unit which performs optical characteristics correction for an output of the signal processing unit on the basis of non-image-formation information set in advance for the infrared transmission lens; a reference temperature detection unit which detects a reference temperature; and a temperature measurement unit which performs absolute temperature conversion for the object on the basis of an output of the optical characteristics correction unit and an output of the reference temperature detection unit.

Effect of the Disclosure

With the infrared imaging device according to the present disclosure, even in a case of using an infrared transmission lens whose optical characteristics are not ideal, signal processing is performed on the basis of the non-image-formation information set in advance for the infrared transmission lens, whereby absolute temperature measurement accuracy can be improved and an image with an improved image formation property can be acquired.

DESCRIPTION OF EMBODIMENTS

Embodiment 1

Figure 1:
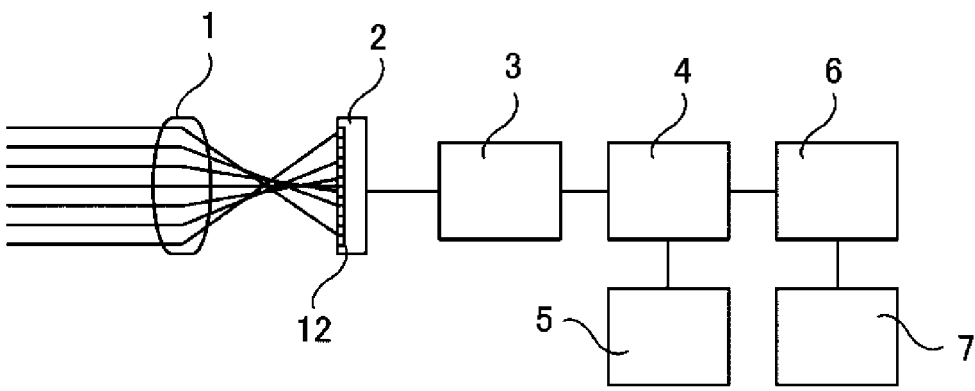
FIG. 1 is a function block diagram of an infrared imaging device according to embodiment 1.

FIG. 1 is a function block diagram of an infrared imaging device according to embodiment 1.

The infrared imaging device includes an infrared imaging element 2 having a pixel area 12 in which pixels for converting received infrared light to electric signals are arranged in a two-dimensional array, an infrared transmission lens 1 provided between the infrared imaging element 2 and an object and located so as to collect infrared light emitted from the object to form an image, a signal processing unit 3 which receives the electric signals from the infrared imaging element 2 and performs signal amplification, conversion to digital signals, and the like, and an optical characteristics correction unit 4 for performing correction processing on the basis of an output of the signal processing unit 3 and non-image-formation information of the infrared transmission lens 1 accumulated in an optical member non-image-formation information storage unit 5, and is configured to perform calculation for object temperature information in a temperature measurement unit 6 by receiving a signal component corrected by the optical characteristics correction unit 4, i.e., an output of the optical characteristics correction unit 4, and a signal component from a reference temperature detection unit 7 which acquires reference temperature information, i.e., an output of the reference temperature detection unit 7.

Figure 2:
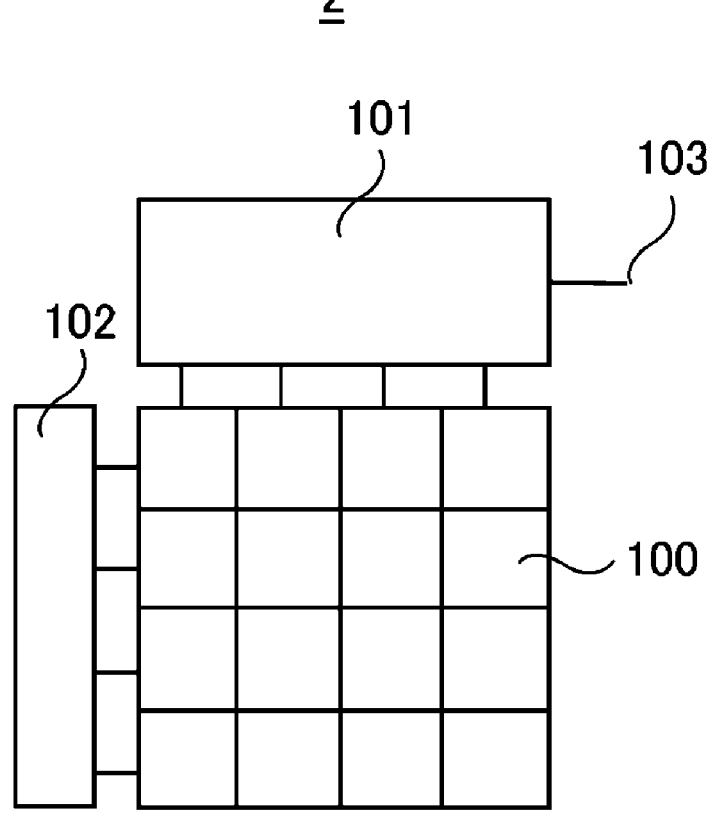
FIG. 2 shows the configuration of an infrared imaging element.

FIG. 2 shows the configuration of the infrared imaging element 2. Pixel portions 100 for receiving entering infrared light and performing conversion to electric signals are arranged in, preferably, a two-dimensional array, and a drive line selecting circuit 102 for controlling current-application timings for the pixel portions 100 and a reading circuit 101 for amplifying and reading signal components outputted from the pixel portions 100, are provided. The electric signals from the pixel portions 100 arranged in a two-dimensional array are sequentially outputted through a signal output end 103 from the reading circuit 101.

Figure 3:
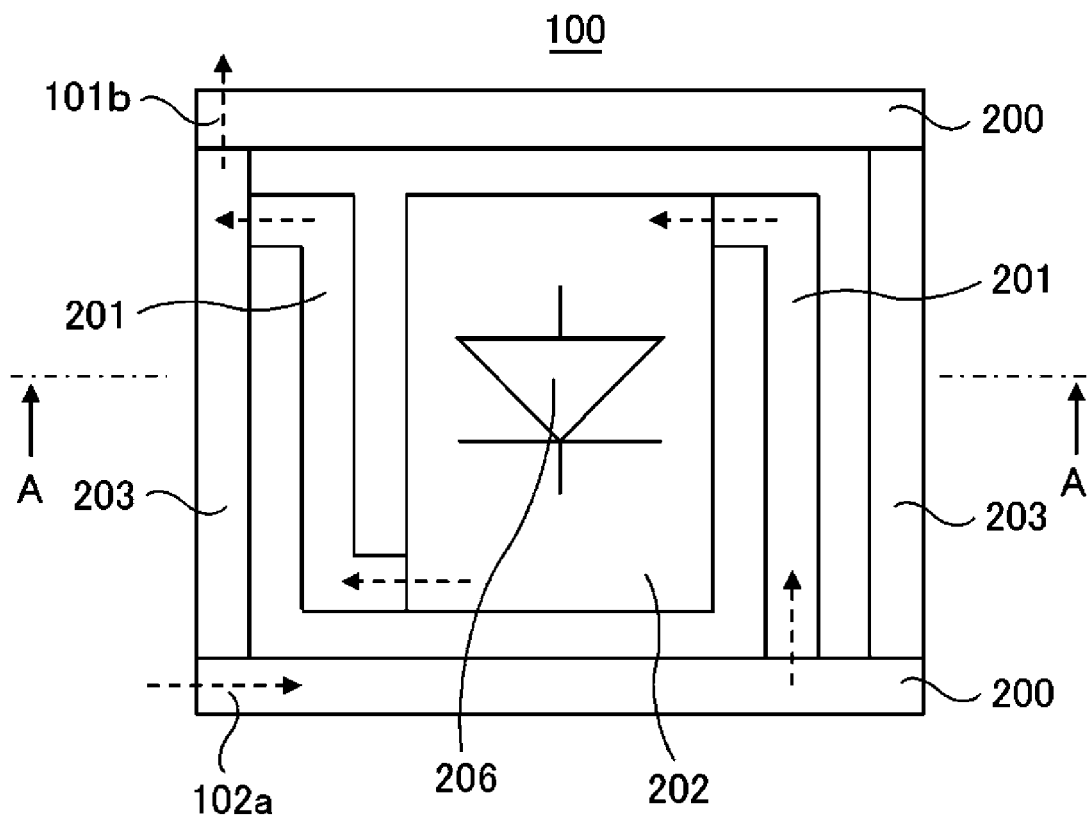
FIG. 3 shows the configuration of a pixel.
Figure 3:
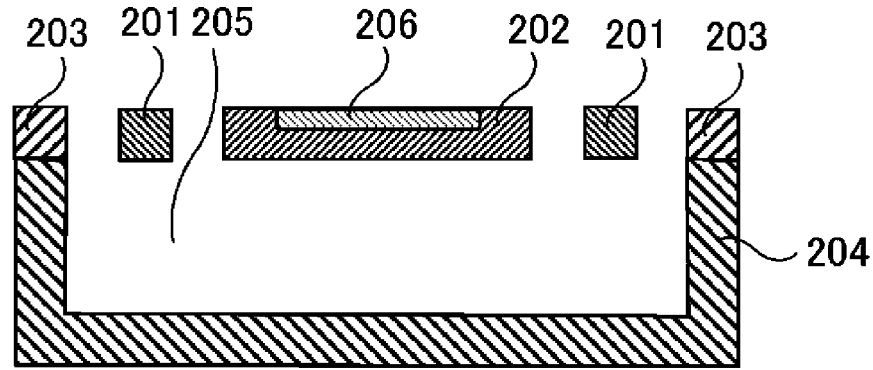

FIG. 3 shows the configuration of the pixel portion 100. A view on the upper side in FIG. 3 is a top view of the pixel portion 100 and a view on the lower side in FIG. 3 is a sectional view along line A-A in the top view.

A temperature detection unit 202 is provided in a hollow heat insulation structure 205, while being supported by a hollow support leg wire 201 electrically and thermally connected to a drive line wire 200 connected to the drive line selecting circuit 102. Here, the hollow heat insulation structure 205 may be formed by performing etching or the like on a part of a substrate 204 or by etching a sacrifice layer formed by another constituent component such as an organic layer.

In the temperature detection unit 202, a thermoelectric conversion mechanism 206 composed of a diode, a bolometer, or the like is provided for detecting a component of infrared light emitted from the object. An electric signal generated at the temperature detection unit 202 is transmitted via another hollow support leg wire 201 and a signal line wire 203 to the reading circuit 101. In the view on the upper side in FIG. 3, reference character 102$a$ denotes the direction of current flowing from the drive line selecting circuit 102, and reference character 101$b$ denotes the direction of current flowing to the reading circuit 101.

Here, the electric signal outputted from the temperature detection unit 202 contains, as components thereof, a self-heat-generation component due to the substrate temperature and current application, and a component of infrared light emitted from the optical-system members such as the lens, the lens tube holding the optical-system members, and the like. That is, with variation in the ambient temperature or the like, the electric signal level of the temperature detection unit 202 varies. In order to reduce variation in the electric signal level, it is general to take measures for stabilizing the module temperature and the housing temperature.

Hereinafter, in an infrared imaging device 20 according to embodiment 1, the necessity for providing the optical characteristics correction unit 4 to correct the optical characteristics on the basis of non-image-formation information set in advance for the infrared transmission lens 1 will be described.

Figure 4:
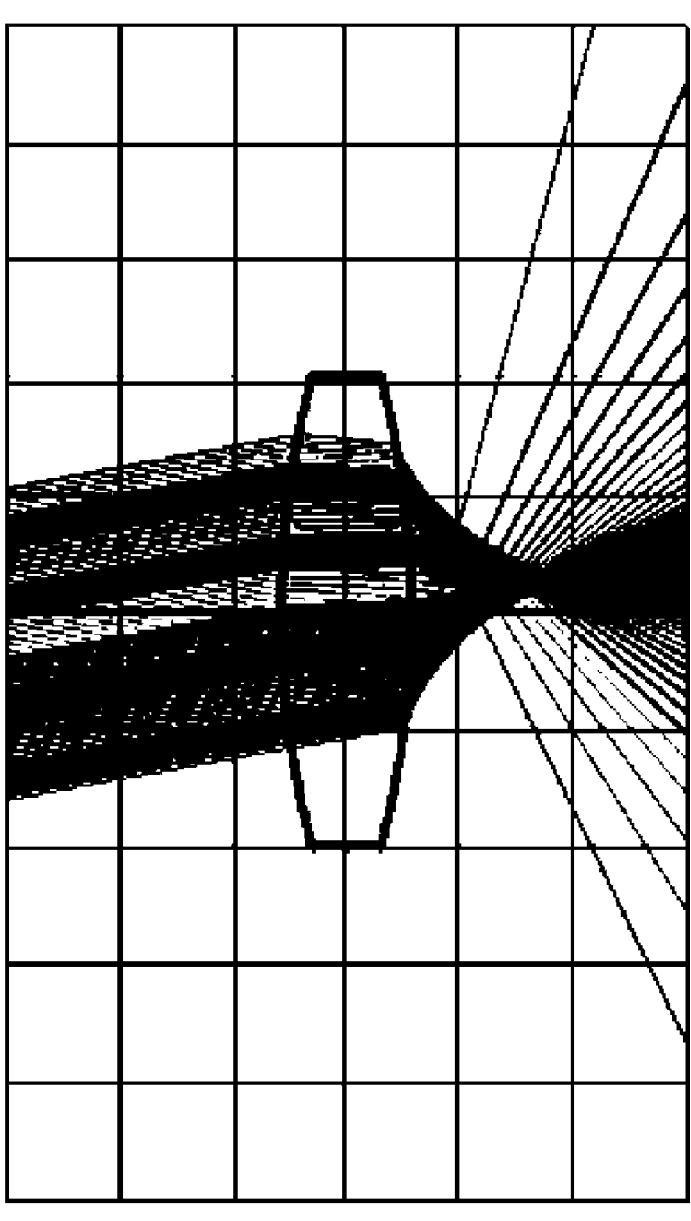
FIG. 4 shows a calculation result of the image formation property of a biconvex spherical Si lens in a case where an incident ray angle is 10 degrees.

In a biconvex Si lens generally used, if the image formation property is calculated with the incident ray angle set at 10 degrees, as shown in FIG. 4, it is found that the incident parallel rays do not concentrate on one point but are dispersed. This is the cause for deteriorating the lens image formation property. Even when a point light source is imaged, the light enters in a dispersed state like a normal distribution around the image formed point.

Figure 5:
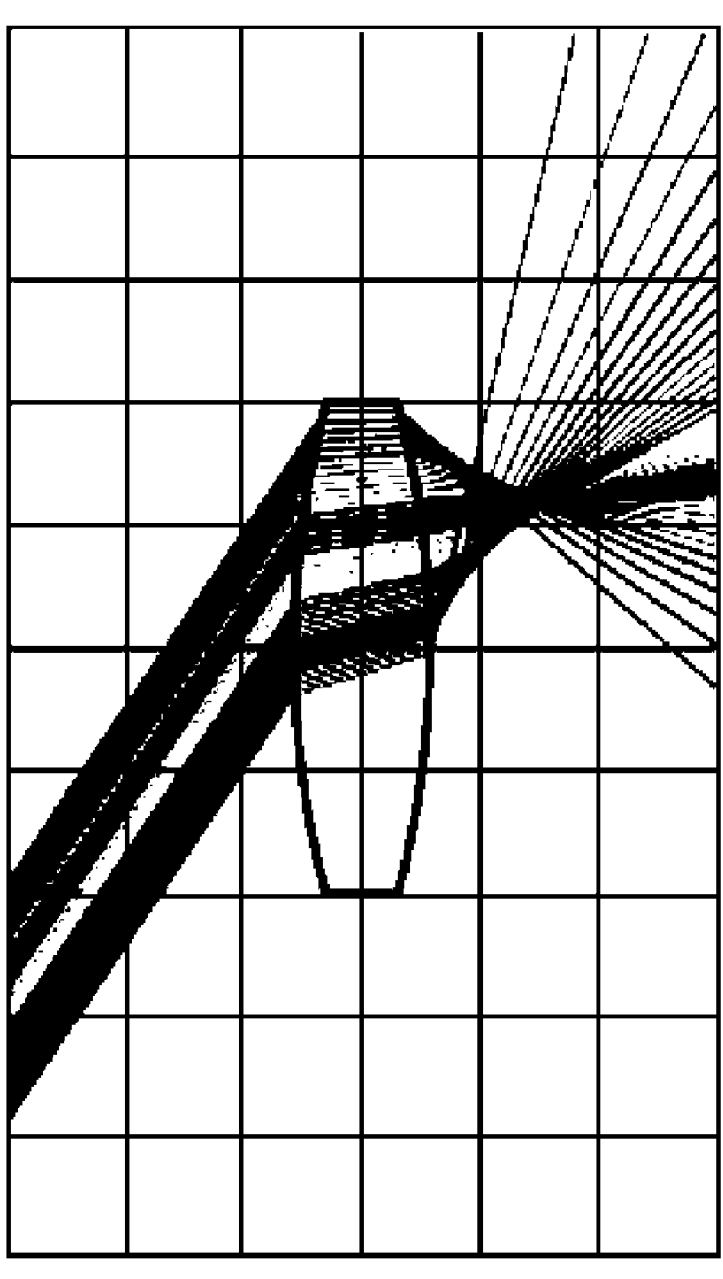
FIG. 5 shows a calculation result of the image formation property of a biconvex spherical Si lens in a case where an incident ray angle is 55 degrees.

FIG. 5 shows a calculation result for rays in a case where the incident ray angle is set at 55 degrees, which is greater than the incident ray angle in FIG. 4. From comparison between FIG. 4 and FIG. 5, it is understood that the light amount of entering rays differs depending on the incident ray angle to the optical lens. This leads to sensitivity variations due to the light amount difference between an optical center part and an outer peripheral part, i.e., a shading component. At the same time, it is found that the focal length to the image formed point is different between FIG. 4 and FIG. 5.

In a case where the incidence angle of rays is great, the effective optical focal length is shorter than in a case where the incidence angle of rays is small. This is a phenomenon called field curvature and leads to occurrence of difference in the image blur degree between a center part and an outer peripheral part of an obtained image.

Figure 6:
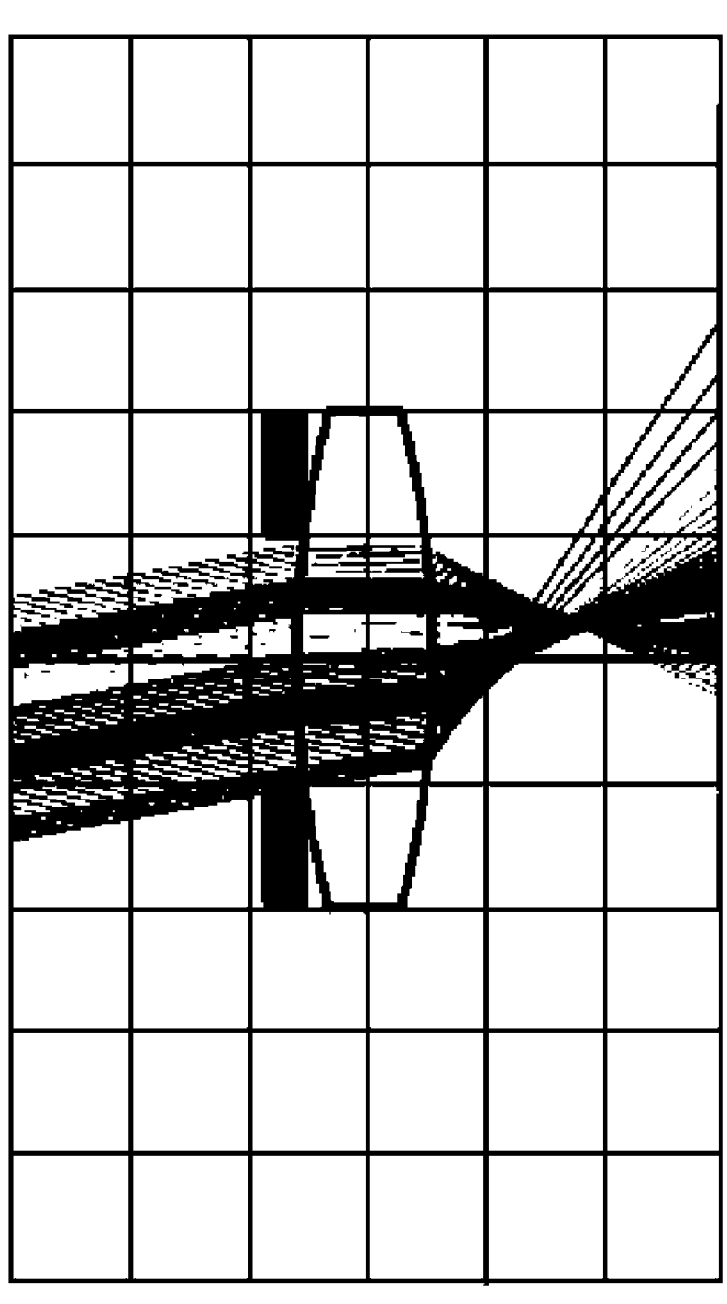
FIG. 6 shows a calculation result of the image formation property of a biconvex spherical Si lens provided with an aperture.

In order to solve the above problem of the biconvex Si lens, improvements for optical systems have been generally made. For example, an aperture as shown in FIG. 6 is provided in front of an optical lens so as to remove unnecessary light, whereby it is possible to improve the image formation property apparently. However, as is found from comparison between FIG. 4 and FIG. 6, the absolute amount of entering light is decreased by the aperture, so that the sensitivity decreases.

Figure 7:
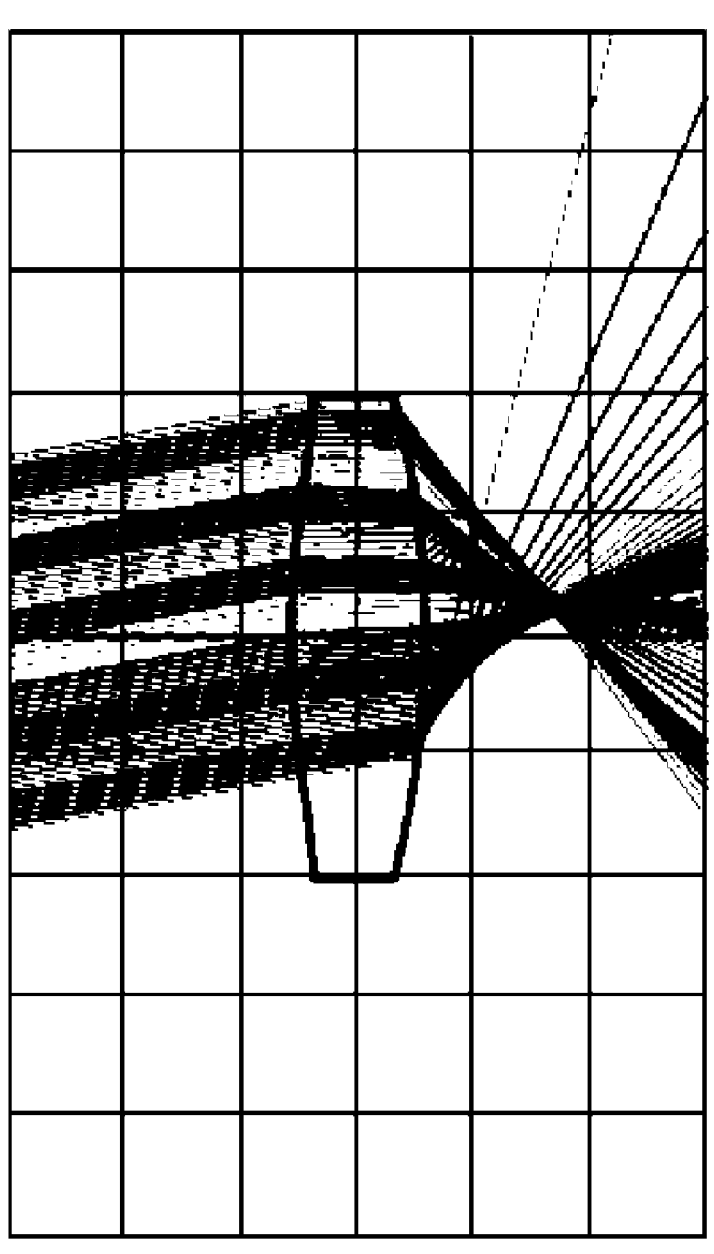
FIG. 7 shows a calculation result of the image formation property of a biconvex aspheric Si lens.

It is also general to make an optical lens in an aspheric shape as shown in FIG. 7. FIG. 7 shows a calculation result in a case of simulating a lens having an aspheric shape only on an object-side surface, and it is found that improvement is successfully made as compared to FIG. 4. Further, it is found that the light entering amount is also increased.

As described above, it is found that making the optical lens in an aspheric shape has a significantly great advantage with respect to the characteristics of the image sensor. In a visible-light image sensor region, a resin material or a glass material is used as the optical lens material, and therefore there is not a great cost impact for applying the aspherical shape.

Meanwhile, as a material that allows transmission for wavelengths in an infrared region generally typified by 8 to 14 μm, Ge, chalcogenide glass, Si, or the like is generally used. However, chalcogenide glass which enables formation of an aspheric shape by sintering working has a disadvantage in cost because the material itself is expensive.

For Ge or Si, sintering working is impossible and aspheric lens working by cutting leads to significantly great cost increase.

In order to solve such a problem, a technology of performing aspheric shape working by using grayscale etching on a Si wafer has been proposed. However, this requires a very high-level surface working technology for making an aspheric lens, and thus a problem remains in terms of working accuracy.

Here, tendency of change in a taken image due to deterioration of the lens image formation property described above is schematically shown in FIG. 8. In addition, the output luminance on line A-B in FIG. 8 is schematically shown in FIG. 9.

Figure 8:
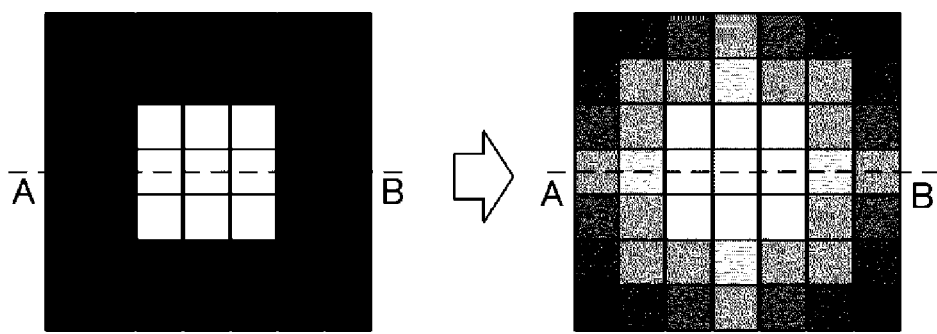
FIG. 8 shows tendency of change in a taken image due to deterioration of the lens image formation property.
Figure 9:
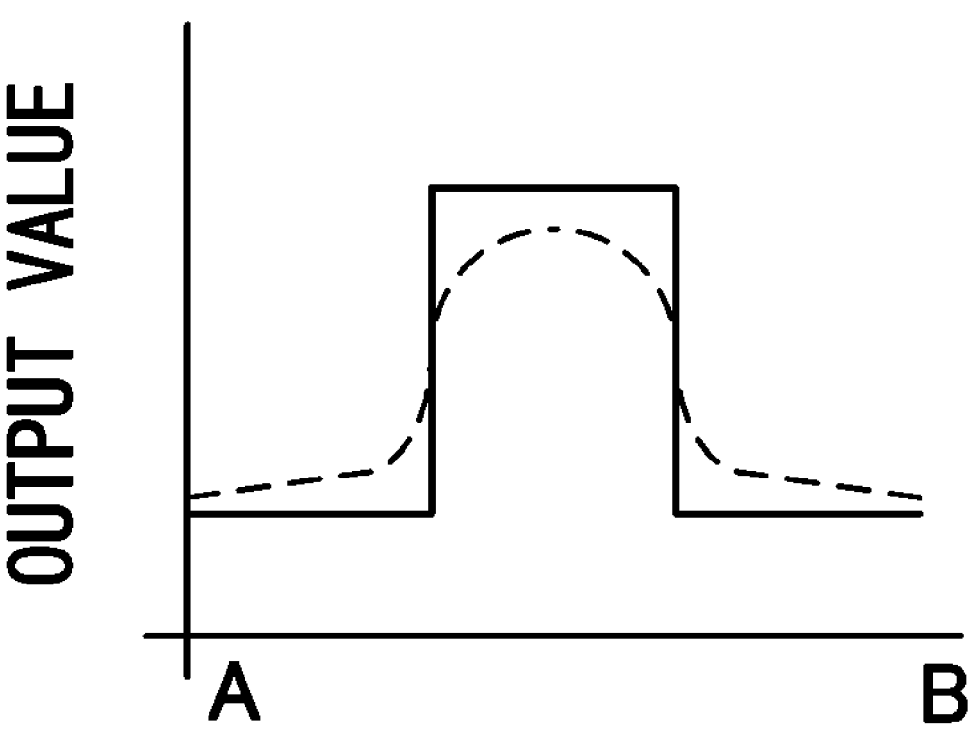
FIG. 9 shows tendency of luminance values in a taken image due to deterioration of the lens image formation property.

In a case of imaging an object by an optical lens having ideal optical characteristics, an output luminance based on temperature information and a surface emissivity of the object can be obtained as shown in a view on the left side in FIG. 8. Further, as shown by a solid line in FIG. 9, object-background blur does not arise and thus a favorable output can be obtained. That is, on the basis of the output luminance, temperature information for each part can be easily obtained through calculation.

On the other hand, in a case of imaging an object by an optical lens not having ideal optical characteristics, which is typified by a spherical Si lens, temperature information of the object is influenced by the background temperature, the object imaging size, and the like as shown in a view on the right side in FIG. 8. Specifically, as shown by a broken line in FIG. 9, the lower the background temperature is, the smaller the object output luminance is, and the smaller the object size is, the smaller the object output luminance is. That is, it is difficult to accurately calculate temperature information for each part on the basis of the output luminance through calculation, and visual recognition performance is deteriorated by object-background blur.

In view of the above consideration, the infrared imaging device according to the present disclosure has the device configuration shown in FIG. 1 as a basic configuration, for enabling appropriate correction of image blur due to deterioration of the lens image formation property even in a case of using the infrared transmission lens 1 whose optical characteristics are not ideal. Hereinafter, the operation principle of the infrared imaging device according to embodiment 1 will be described in detail.

The optical characteristics correction unit 4 for performing correction processing on the basis of non-image-formation information set in advance for the infrared transmission lens 1 will be described below.

Assuming a case of using an ideal optical system, the output value of each of arrayed pixels arranged in a two-dimensional array is defined as an ideal output value P(i, j). Then, the degree of dispersion to surrounding pixels when light from a point light source enters a given point (x, y) in the pixel array is defined as a dispersion degree $r_{(x, y)}(i, j)$. An actual measured output value Q(x, y) actually outputted at the point (x, y) can be represented by the following Expression (1) using the ideal output value P(i, j) and the dispersion degree $r_{(x, y)}(i, j)$.

[Mathematical 1]

$$Q(x,y)=\Sigma\{P(i,j)\times r_{(x,y)}(i,j)\} \tag{1}$$

The dispersion degree $r_{(x, y)}(i, j)$ is a dispersion degree determined by the optical lens and the like, i.e., non-image-formation information of the infrared transmission lens 1 accumulated in the optical member non-image-formation information storage unit 5. The dispersion degree may be derived from an actual measured value obtained by measuring the infrared transmission lens 1 in shipping examination or the like, or may be set at an ideal value calculated from the lens design as long as error is in a permissible range. To be exact, the dispersion degree changes with respect to the incidence angle, but if error is permitted, a representative value may be set for the incidence angle.

The dispersion degree $r_{(x, y)}(i, j)$ may be set with the influence range limited. That is, if dispersion only in a limited range such as several pixels or ten pixels around the point (x, y) is a principal factor, processing may be performed so as to neglect the other pixel area.

The actual measured output value Q(x, y) of each of the arrayed pixels is an actual measured value, and the dispersion degree $r_{(x, y)}(i, j)$ determined by the optical lens and the like is calculated or measured in advance. Therefore, it is possible to calculate the ideal output value P(i, j) through analytical calculation using Expression (1). In this case, it is also possible to reduce the load for the analysis calculation by adjusting setting for the dispersion degree $r_{(x, y)}(i, j)$ as described above.

Further, for reducing the analytical calculation load, the following linear calculation means may be adopted.

An output in a case of assuming that the actual measured output value Q(x, y) actually outputted at the point (x, y) is further multiplied by the dispersion degree $r_{(x, y)}(i, j)$ of the infrared transmission lens 1 is defined as an assumptive output value S(x, y). In this case, the assumptive output value S(x, y) can be represented by the following Expression (2).

[Mathematical 2]

$$S(x,y)=\Sigma\{Q(i,j)\times r_{(x,y)}(i,j)\} \tag{2}$$

In this case, the ratio of a difference value between the ideal output value P(x, y) and the actual measured output value Q(x, y) and a difference value between the actual measured output value Q(x, y) and the assumptive output value S(x, y) can be represented and arranged as shown in the following Expression (3).

[Mathematical 3]

$$\frac{P(x, y) - Q(x, y)}{Q(x, y) - S(x, y)} = \frac{P(x, y) - \sum\{P(i, j)\times r_{(x,y)}(i, j)\}}{Q(x, y) - \sum\{Q(i, j)\times r_{(x,y)}(i, j)\}} = \tag{3}$$

$$\frac{P(x, y) - \sum\{P(i, j)\times r_{(x,y)}(i, j)\}}{\sum\{P(i, j)\times r_{(x,y)}(i, j)\} - \sum\{\sum P(n, m)\times r_{(i,j)}(n, m)\}\times r_{(x,y)}(i, j)} =$$

$$\frac{P(x, y) - \sum\{P(i, j)\times r_{(x,y)}(i, j)\}}{\sum\left[r_{(x,y)}(i, j)\times\left[P(i, j) - \sum\{P(n, m)\times r_{(i,j)}(n, m)\}\right]\right]}$$

Here, the denominator term of Expression (3) can be approximated as shown in the following Expression (4).

[Mathematical 4]

$$\Sigma[r_{(x,y)}(i,j)\times[P(i,j)-\Sigma\{P(n,m)\times r(i,j)\times r_{(i,j)}(N,m)\}]]\approx$$
$$\{\Sigma r_{(x,y)}(i,j)\}\times[P(x,y)-\Sigma\{P(i,j)\times r_{(x,y)}(i,j)\}] \tag{4}$$

On the other hand, the numerator term of Expression (3) is represented as shown in the following Expression (5).

[Mathematical 5]

$$P(x,y)-\Sigma\{P(i,j)\times r_{(x,y)}(i,j)\}=\text{constant} \tag{5}$$

That is, the left-side term of Expression (5) is approximated as a constant, whereby the ratio of the difference value between the ideal output value P(x, y) and the actual measured output value Q(x, y) and the difference value between the actual measured output value Q(x, y) and the assumptive output value S(x, y) can be linearly approximated as a proportionality constant α, as shown in the following Expression (6).

[Mathematical 6]

$$P(x,y)-Q(x,y)=\{Q(x,y)-S(x,y)\}\times\alpha \tag{6}$$

As described above, for calculating the ideal output value P(i, j) directly from the actual measured output value Q(x, y) and the dispersion degree $r_{(x, y)}(i, j)$, complicated calculation including matrix calculation is needed, but from the actual measured output value Q(x, y) and the dispersion degree $r_{(x, y)}(i, j)$, the assumptive output value S(x, y) which is an output in the case of assuming that the actual measured output value Q(x, y) is further multiplied by the dispersion degree $r_{(x, y)}(i, j)$ of the infrared transmission lens 1 can be calculated through simple calculation. By deriving the ideal output value P(i, j) through linear calculation from the actual measured output value Q(x, y) and the assumptive output value S(x, y), the calculation load can be greatly reduced.

The calculation of the correction value for the optical characteristics by linear approximation will be further described.

Figure 10:
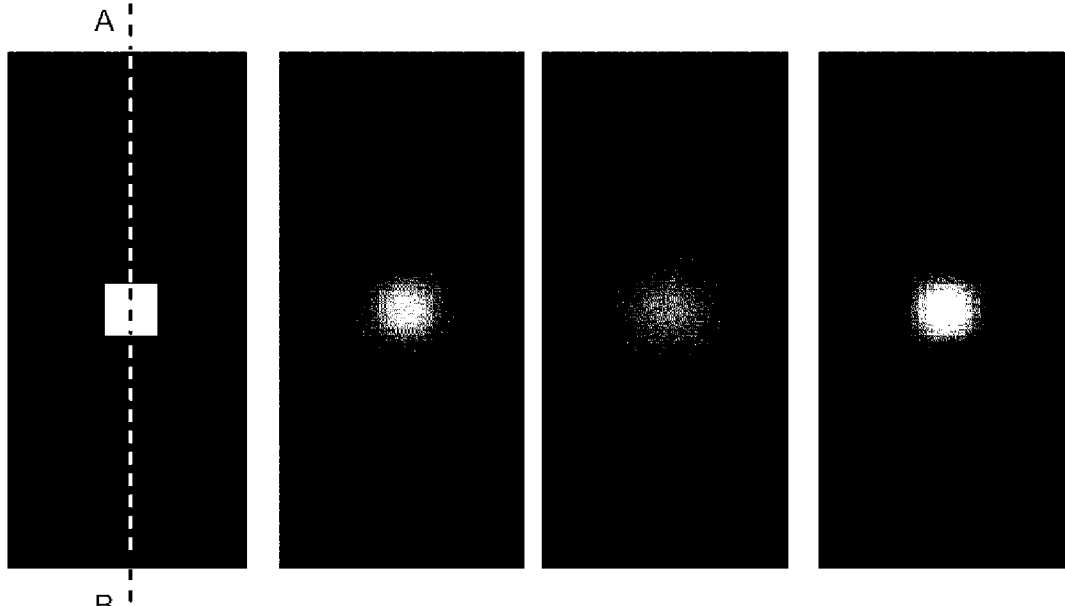
FIG. 10 shows conceptual views of image correction through optical characteristics correction in the infrared imaging device according to embodiment 1.
Figure 11:
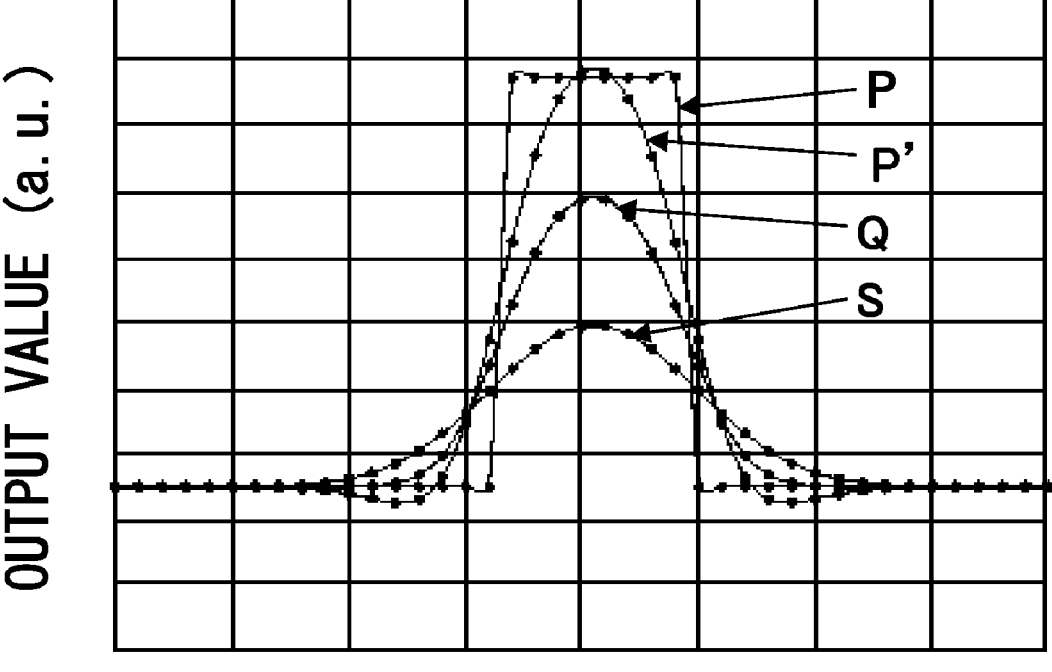
FIG. 11 shows tendency of luminance value correction through optical characteristics correction in the infrared imaging device according to embodiment 1.

FIG. 10 and FIG. 11 show results of calculating the effect of the optical characteristics correction by simulation from the relationship among the ideal output value P(x, y), the actual measured output value Q(x, y), and the assumptive output value S(x, y).

In FIG. 10, the ideal output value P(x, y) is set as a simulation image in a case of imaging a square object, and the dispersion degree $r_{(x, y)}(i, j)$ is arbitrarily set to be constant over the screen range. In FIG. 10, the ideal output value P(x, y), the actual measured output value Q(x, y), the assumptive output value S(x, y), and a reproduced image P'(x, y) derived from the actual measured output value Q(x, y) and the assumptive output value S(x, y) are respectively shown in the first, second, third, and fourth views from the left in FIG. 10.

FIG. 11 is a graph showing outputs on line A-B for the ideal output value P(x, y), the actual measured output value Q(x, y), the assumptive output value S(x, y), and the reproduced image P'(x, y) in FIG. 10, which respectively correspond to the first, second, third, and fourth views from the left in FIG. 10.

In the reproduced image P'(x, y), error occurs in correction at a point where the output value is switched, but error of the output value is small at the center part of the object, thus obtaining an effect of improving temperature determination accuracy. In addition, also at the point where the output value is switched, i.e., the outline part which is blurred in the actual measured output value Q(x, y), an effect of slightly enhancing the edge is obtained.

With the correction calculation for the optical characteristics by linear approximation in the present disclosure, the effects of improving temperature determination accuracy and enhancing the edge can be obtained in the same manner also in a case where there is an adjacent object having a high or low temperature.

Figure 12:
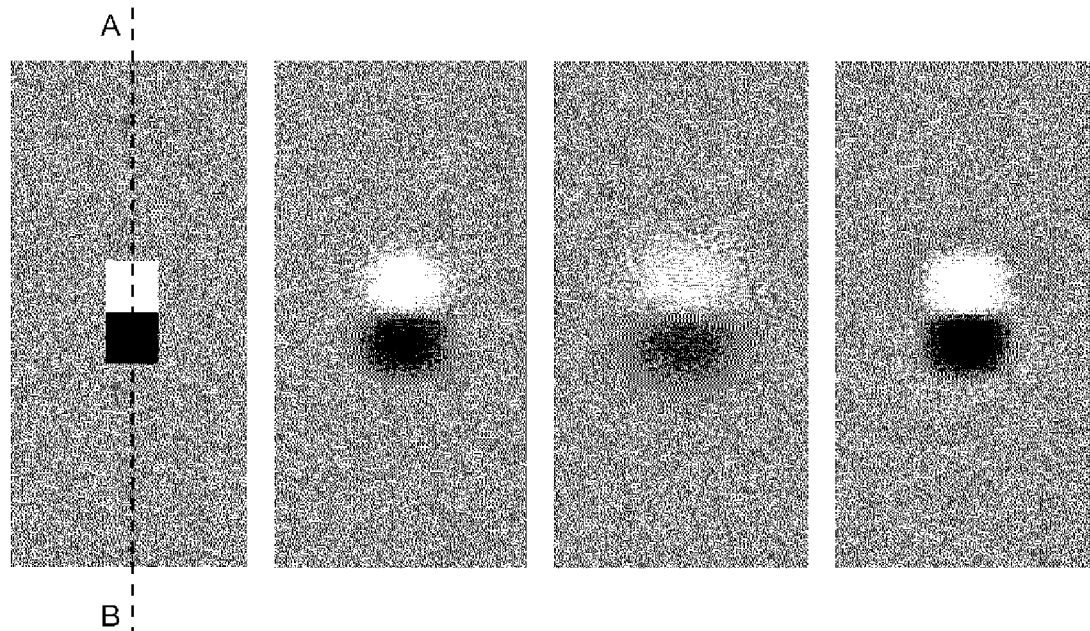
FIG. 12 shows conceptual views of image correction through optical characteristics correction in the infrared imaging device according to embodiment 1.
Figure 13:
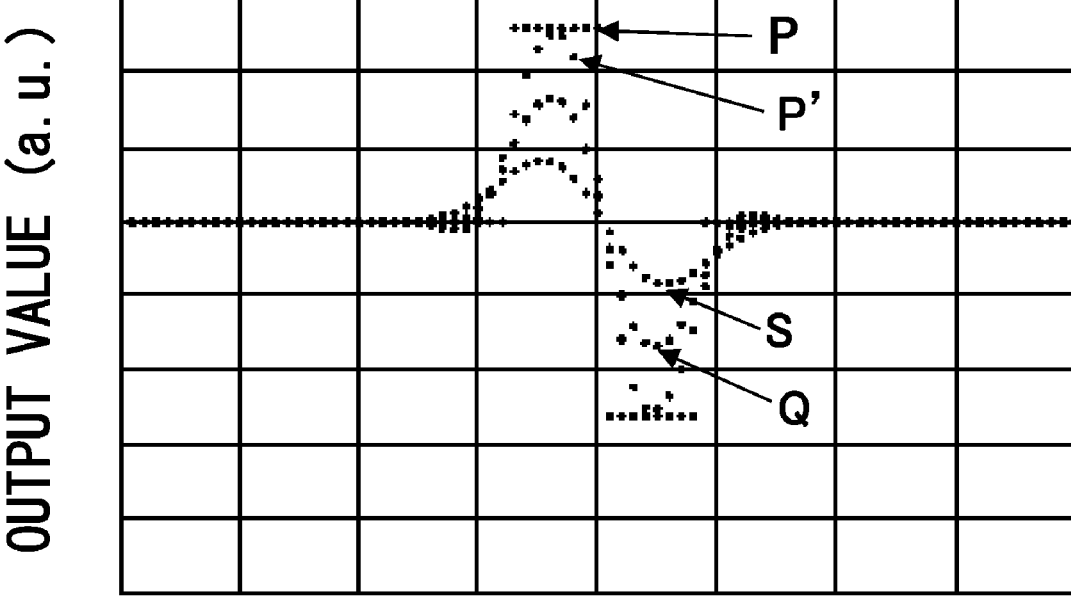
FIG. 13 shows tendency of luminance value correction through optical characteristics correction in the infrared imaging device according to embodiment 1.

FIG. 12 shows a simulation image and a reproduced image and FIG. 13 is a graph showing outputs thereof on line A-B, as in FIG. 10 and FIG. 11, respectively.

The graph in FIG. 13 shows outputs obtained by performing correction calculation in a case of assuming that there is an adjacent object having a high or low temperature as an object model as shown in FIG. 12. As in the case of FIG. 10 and FIG. 11, it can be confirmed that the effects of improving temperature determination accuracy and enhancing the edge are obtained.

Figure 14:
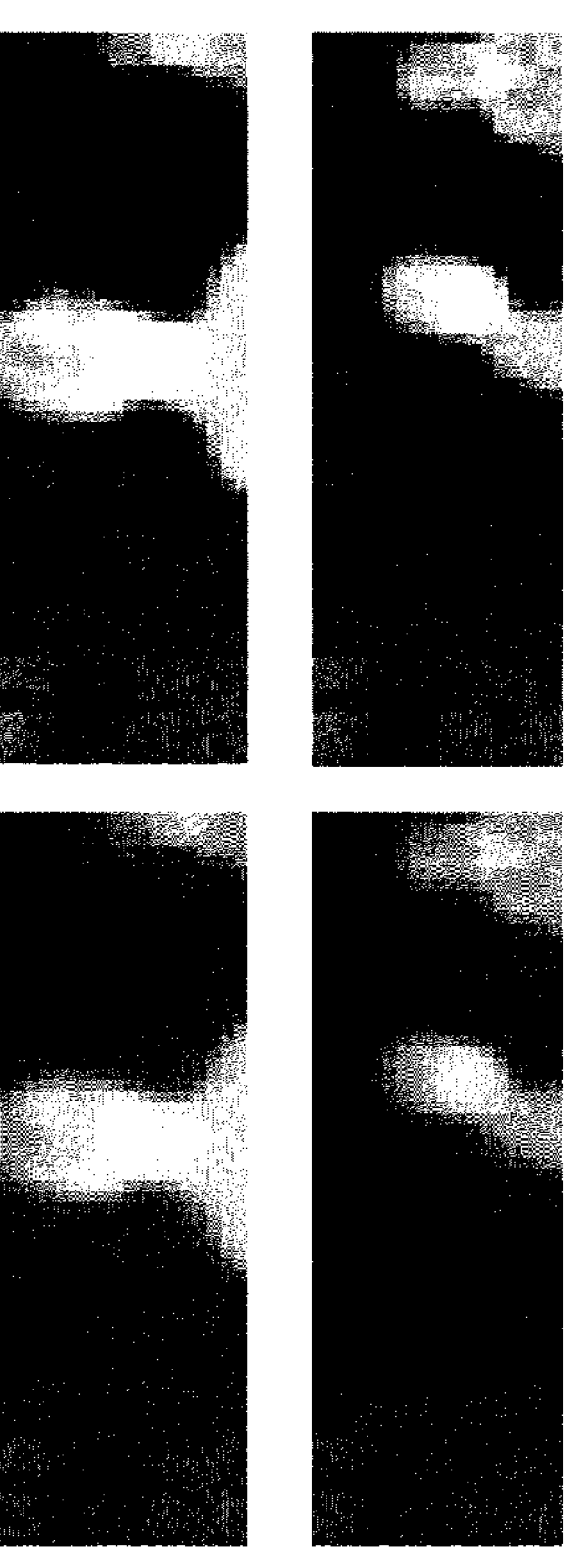
FIG. 14 shows an actual measurement result of image correction through optical characteristics correction in the infrared imaging device according to embodiment 1.

FIG. 14 shows an actual result of assessing the effects of the optical characteristics correction on actual imaged data when the dispersion degree $r_{(x,\ y)}(i, j)$ determined by the optical lens is subjected to the following conditions (a) to (d).

(a) Derive from the optical design value
(b) Limit to 21×21 pixels
(c) Assume no change with respect to the incidence angle
(d) Correct the output value by linear calculation In images before the optical characteristics correction shown in two views on the left side in FIG. 14, regarding the luminance values of objects, i.e., persons in the images, the luminance value of the smaller object is changed to be small, and also, blur arises at a boundary part between the person and the background. In contrast, in images after the optical characteristics correction shown in two views on the right side in FIG. 14, changes in the output luminance values are small and blur at the boundary part is also reduced.

Figure 15:
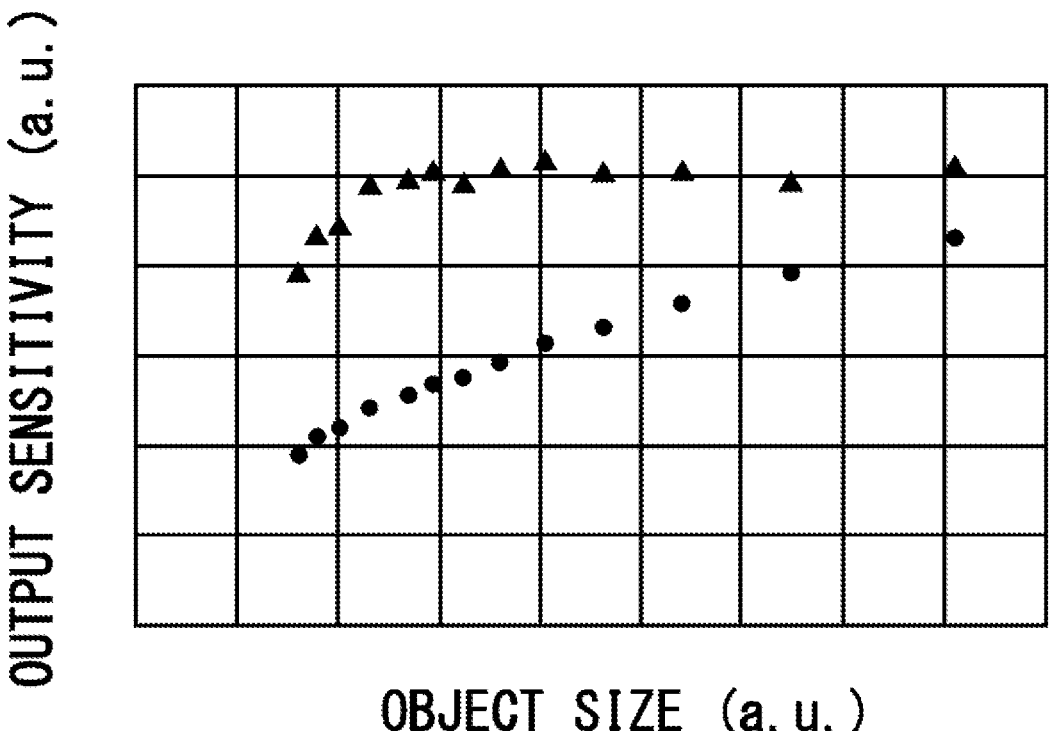
FIG. 15 shows object size dependency of output temperature sensitivity in the infrared imaging device according to embodiment 1.

FIG. 15 is a graph showing a result of measuring the output temperature sensitivity (i.e., the change amount of the output luminance when the object temperature changes by 1° C.) with respect to the object size in a case of using the same correction method. In FIG. 15, black filled circles indicate output sensitivity values from an image before the optical characteristics correction, and black filled triangles indicate output sensitivity values from an image after the optical characteristics correction. It is found that, in a case where the object size is extremely reduced, the output sensitivity values become small, but otherwise, correction is successfully performed so that the output sensitivity values become constant.

Next, supplementary description will be given for calculation of object temperature information in the temperature measurement unit 6.

As described above, signal components from the temperature detection unit 202 contain a temperature change component due to infrared light emitted from an object, a self-heat-generation component due to the substrate temperature and current application, and a component of infrared light emitted from the optical-system members such as the lens, the lens tube holding the optical-system members, and the like. That is, in order to perform temperature detection of the object, it is necessary to perform calculation for the object temperature information.

Figure 16:
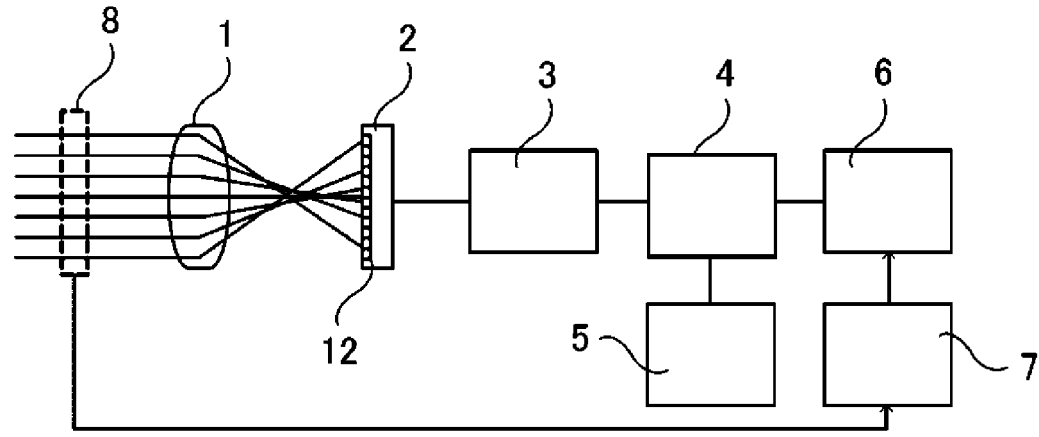
FIG. 16 is a function block diagram of the infrared imaging device according to embodiment 1.

As an example, as in a function block diagram of the infrared imaging device shown in FIG. 16, a mechanical shutter 8 is provided in front of the infrared transmission lens 1. Then, the temperature of the mechanical shutter 8 is measured by the reference temperature detection unit 7, and at the same time, the output value when the mechanical shutter 8 is imaged is stored in advance. In this configuration, the temperature of the mechanical shutter 8 is used as the reference temperature. As a matter of course, the same effects are obtained even in a case of using a shutter mechanism other than the mechanical shutter 8.

First, it is assumed that the temperature of the mechanical shutter 8 is $T_1$ and the obtained output value is $P_1$. Next, the mechanical shutter 8 is removed and an output when an object is imaged is measured. The measured output value is assumed to be $P_2$. The output temperature sensitivity (i.e., the output luminance change amount when the object temperature changes by 1° C.) after the above optical characteristics correction is performed is denoted by dP/dT. In this case, an object temperature $T_2$ can be represented by the following Expression (7).

[Mathematical 7]

$$T_2=(P_2-P_1)\div dP/dT+T_1 \tag{7}$$

Here, regarding the output temperature sensitivity dP/dT, as shown in the above description about the optical characteristics correction, the optical characteristics correction is performed on the basis of the non-image-formation information of the infrared transmission lens 1 accumulated in the optical member non-image-formation information storage unit 5, whereby, in a case where the object size is extremely reduced, the output sensitivity values become small, but otherwise, correction is successfully performed so that the output sensitivity values become constant. That is, measurement accuracy for the object temperature $T_2$ is improved.

Meanwhile, also in a case where, without providing the mechanical shutter 8, an object having a temperature equivalent to the room temperature, such as a wall or a floor, is imaged and the room temperature is measured by the reference temperature detection unit 7 as in the infrared imaging device shown in FIG. 1, the same effects are obtained.

Here, the output temperature sensitivity dP/dT will be additionally described. Infrared light emitted from an object is composed of various wavelength bands, and the sum of emitted light amounts obtained through integration over the entire wavelength band has characteristics of the fourth power of the temperature in accordance with the Planck's law.

In addition, the transmittance of the optical system such as the infrared transmission lens 1 has wavelength characteristics. For example, in a case of a Si lens, the transmittance is small for a wavelength in a band of 8 μm, whereas the transmittance is high for a wavelength in a band of 10 μm to 12 μm. Further, there are wavelength characteristics also in terms of absorptivity of the temperature detection unit 202 in the infrared imaging device 20. That is, a product of the entering light amount wavelength characteristics, the optical system wavelength characteristics, and the sensor absorptivity wavelength characteristics is calculated, the product is integrated over the entire wavelength range, and the result thereof is the entering light amount that can be detected.

The output temperature sensitivity dP/dT is a value proportional to the entering light amount that can be detected, and has a complicated function system with respect to the object temperature. For using the output temperature sensitivity dP/dT in calculation, a conversion table with respect to the object temperature may be prepared or a function system of a quadratic or cubic function may be applied. If measurement error is permitted, a linear function system may be applied.

With the correction circuit configuration and the calculation circuit configuration described above, even in a case of imaging an object by an optical lens not having ideal optical characteristics, which is typified by a spherical Si lens, optical characteristics correction is performed on the basis of non-image-formation information of the infrared transmission lens 1 accumulated in the optical member non-image-formation information storage unit 5. Thus, the temperature information of the object is not influenced by the background temperature, the object imaging size, and the like, and conversion accuracy for the object temperature can be improved. At the same time, deterioration of visual recognition performance due to object-background blur is suppressed and thus an image with its outline enhanced can be obtained.

Embodiment 2

Figure 17:
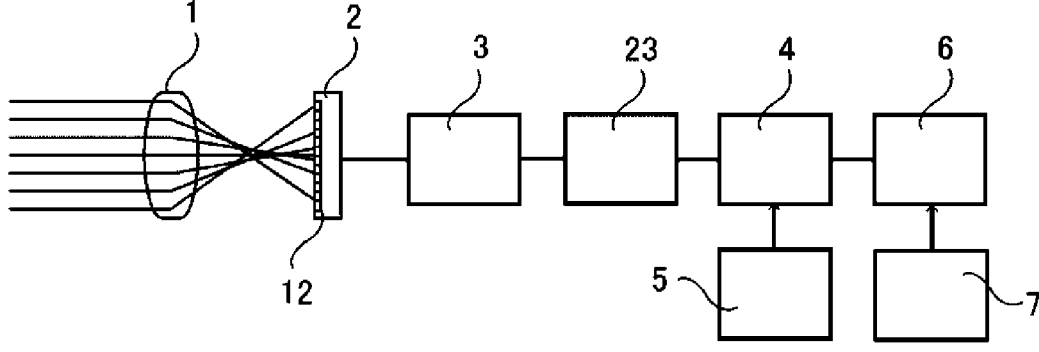
FIG. 17 is a function block diagram of an infrared imaging device according to embodiment 2.

FIG. 17 is a function block diagram of an infrared imaging device according to embodiment 2.

In addition to the constituent components of the infrared imaging device according to embodiment 1, a temperature detection target deriving unit 23 is provided between the signal processing unit 3 and the optical characteristics correction unit 4. By the temperature detection target deriving unit 23, a temperature measurement part in the screen of the infrared imaging element 2 is limited, and the optical characteristics correction is performed only for the limited part. Thus, the calculation amount needed for the optical characteristics correction can be significantly reduced. At the same time, an effect of improving conversion accuracy for the object temperature can be obtained for the specified temperature measurement part.

For example, as the temperature measurement part to be derived by the temperature detection target deriving unit 23, only the point where the output luminance is maximum in the screen may be set, or a plurality of points may be set through image analysis. Alternatively, the same point may be specified at all times.

With the infrared imaging device according to embodiment 2, even in a case of imaging an object by an optical lens not having ideal optical characteristics, which is typified by a spherical Si lens, optical characteristics correction is performed on the basis of non-image-formation information of the infrared transmission lens 1 accumulated in the optical member non-image-formation information storage unit 5. Thus, the temperature information of the object is not influenced by the background temperature, the object imaging size, and the like, and conversion accuracy for the object temperature can be improved. In addition to the above effects as described in embodiment 1, a new effect of significantly reducing the calculation load is obtained.

Embodiment 3

Figure 18:
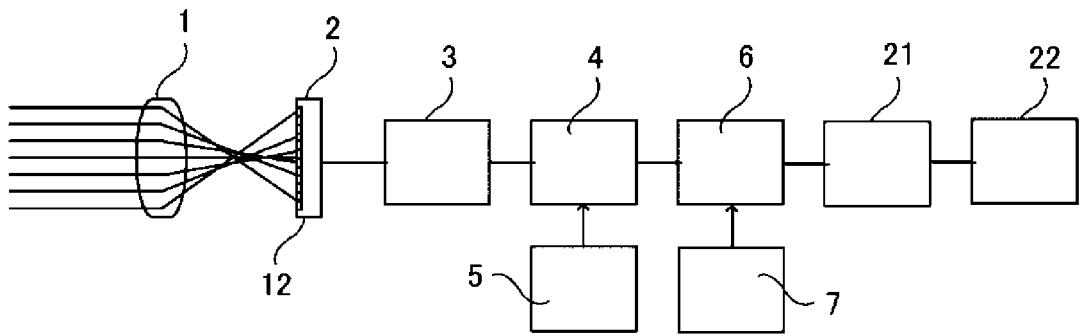
FIG. 18 is a function block diagram of an infrared imaging device according to embodiment 3.

FIG. 18 is a function block diagram of an infrared imaging device according to embodiment 3.

In addition to the constituent components of the infrared imaging device according to embodiment 1, a level stabilization representative point extraction unit 21 and a luminance value adjustment unit 22 which receives an output of the level stabilization representative point extraction unit 21 are provided at stages subsequent to the temperature measurement unit 6. It is estimated that, in the measurement output from the temperature measurement unit 6, a part where an object is moved, i.e., a part where the output value does not greatly vary, corresponds to the room temperature level and the actual temperature thereof is not greatly changed.

On the other hand, signal components from the temperature detection unit 202 contain a self-heat-generation component due to the substrate temperature and current application, and a component of infrared light emitted from the optical-system members such as the lens, the lens tube holding the optical-system members, and the like. That is, due to the influences of disturbances such as wind and sunlight and variations of the ambient temperature and the like, the signal level can vary, so that the output value might not be stabilized.

A part where the output value does not greatly vary is determined by the level stabilization representative point extraction unit 21, and coordinate data of the part where it is determined that the output value level does not greatly vary is outputted to the temperature measurement unit 6. In the temperature measurement unit 6, screen luminance correction or determination temperature correction is performed so that the specified coordinate data output becomes constant, whereby it becomes possible to perform temperature determination and image generation without being influenced by disturbances.

In the level stabilization representative point extraction unit 21, for example, temperature determination may be constantly performed for a plurality of fixed points, and a pixel at which a temporal deviation of the output value is small may be set as a specified pixel, i.e., a representative point, or image analysis may be performed over the entire screen so as to improve accuracy. As an example, a pixel at which variation of the output value is smaller than a predetermined threshold may be extracted as a specified pixel, i.e., a representative point. The luminance value adjustment unit 22 receives an output of the level stabilization representative point extraction unit 21 and thereby adjusts the luminance at the specified pixel, i.e., the representative point.

With the infrared imaging device according to embodiment 3, even in a case of imaging an object by an optical lens not having ideal optical characteristics, which is typified by a spherical Si lens, optical characteristics correction is performed on the basis of non-image-formation information of the infrared transmission lens 1 accumulated in the optical member non-image-formation information storage unit 5. Thus, the temperature information of the object is not influenced by the background temperature, the object imaging size, and the like, so that conversion accuracy for the object temperature is improved.

Further, deterioration of visual recognition performance due to object-background blur is suppressed and thus an image with its outline enhanced can be obtained. In addition to the above effects as described in embodiment 1, a new effect of enabling determination with reduced influence of disturbance is obtained.

Embodiment 4

Figure 19:
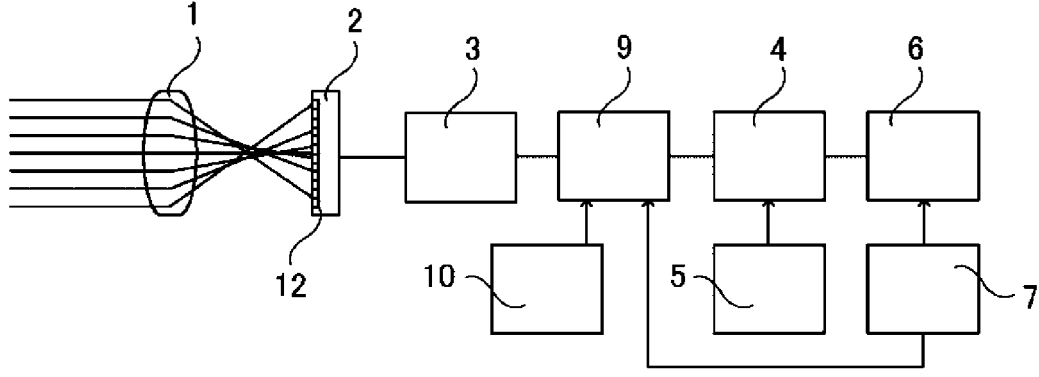
FIG. 19 is a function block diagram of an infrared imaging device according to embodiment 4.

FIG. 19 is a function block diagram of an infrared imaging device according to embodiment 4.

In addition to the constituent components of the infrared imaging device according to embodiment 1, a temperature influence calculation unit 9 is provided between the signal processing unit 3 and the optical characteristics correction unit 4, and the reference temperature information from the reference temperature detection unit 7 and an output influence calculation coefficient storage unit 10 are connected to the temperature influence calculation unit 9. The output influence calculation coefficient storage unit 10 stores output shift tendency with respect to the reference temperature held in advance.

The temperature influence calculation unit 9 performs correction of the output value by combining the reference temperature information from the reference temperature detection unit 7 and the output shift tendency with respect to the reference temperature. Thus, variation of the signal level due to the influences of disturbances such as wind and sunlight and variations of the ambient temperature and the like as described in the infrared imaging device 20 according to embodiment 3 can be corrected, whereby the output value can be stabilized.

With the infrared imaging device according to embodiment 4, even in a case of imaging an object by an optical lens not having ideal optical characteristics, which is typified by a spherical Si lens, optical characteristics correction is performed on the basis of non-image-formation information of the infrared transmission lens 1 accumulated in the optical member non-image-formation information storage unit 5. Thus, the temperature information of the object is not influenced by the background temperature, the object imaging size, and the like, and conversion accuracy for the object temperature is improved.

Further, deterioration of visual recognition performance due to object-background blur is suppressed and thus an image with its outline enhanced can be obtained. In addition to the above effects as described in embodiment 1, a new effect of enabling determination with reduced influence of disturbance is obtained as in embodiment 3. Further, the frequency at which shutter correction is performed can be reduced or the shutter mechanism itself can be omitted.

Embodiment 5

Figure 20:
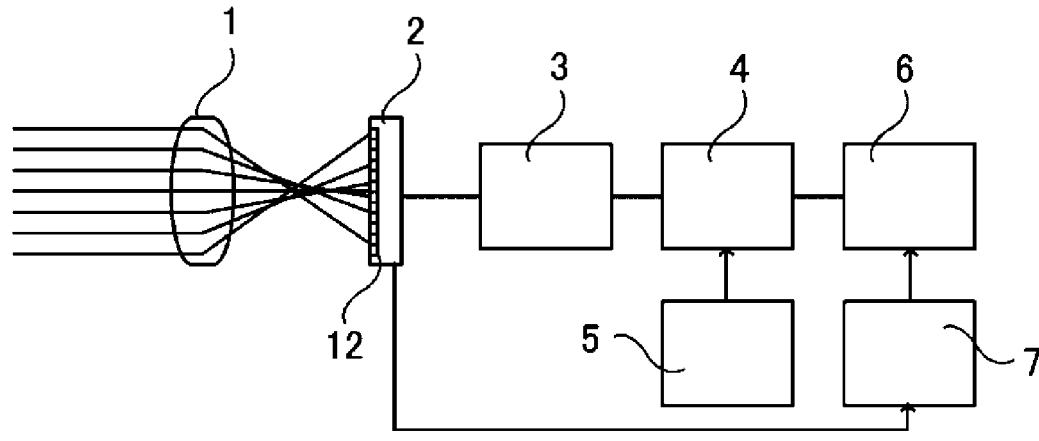
FIG. 20 is a function block diagram of an infrared imaging device according to embodiment 5.

FIG. 20 is a function block diagram of an infrared imaging device according to embodiment 5.

In the configuration of the infrared imaging device according to embodiment 1, the reference temperature to be detected by the reference temperature detection unit 7 may be an output of a temperature sensor provided in the infrared imaging element 2. As described above, signal components from the temperature detection unit 202 contain a self-heat-generation component due to the substrate temperature and current application, and a component of infrared light emitted from the optical-system members such as the lens, the lens tube holding the optical-system members, and the like. By accurately measuring the temperature of the infrared imaging element 2, it becomes possible to improve temperature determination accuracy.

With the infrared imaging device according to embodiment 5, even in a case of imaging an object by an optical lens not having ideal optical characteristics, which is typified by a spherical Si lens, optical characteristics correction is performed on the basis of non-image-formation information of the infrared transmission lens 1 accumulated in the optical member non-image-formation information storage unit 5. Thus, the temperature information of the object is not influenced by the background temperature, the object imaging size, and the like, and conversion accuracy for the object temperature is improved. Further, deterioration of visual recognition performance due to object-background blur is suppressed and thus an image with its outline enhanced can be obtained. In addition to the above effects as described in embodiment 1, it becomes possible to further improve temperature determination accuracy.

Figure 21:
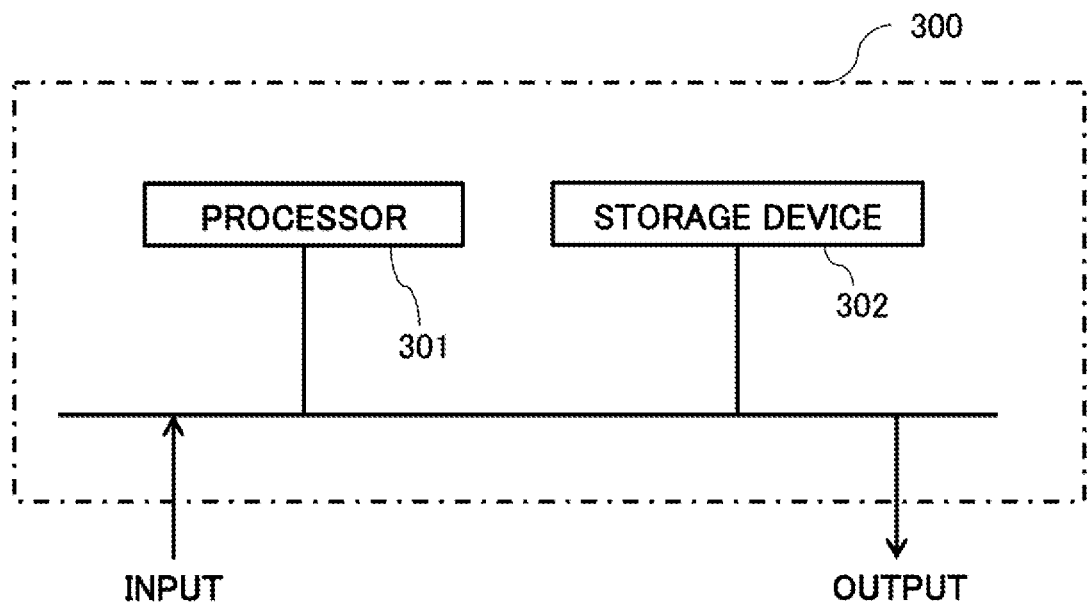
FIG. 21 shows an example of hardware of the infrared imaging device according to each of embodiments 1 to 5.

The configurations of the infrared imaging devices according to embodiments 1 to 5 have been all described using function block diagrams. FIG. 21 shows an example of the configuration of hardware for storing each function block described above. Hardware 300 includes a processor 301 and a storage device 302. Although not shown, the storage device is provided with a volatile storage device such as a random access memory and a nonvolatile auxiliary storage device such as a flash memory. Instead of the flash memory, an auxiliary storage device of a hard disk may be provided. The processor 301 executes a program inputted from the storage device 302. In this case, the program is inputted from the auxiliary storage device to the processor 301 via the volatile storage device. The processor 301 may output data such as a calculation result to the volatile storage device of the storage device 302, or may store such data into the auxiliary storage device via the volatile storage device.

Although the disclosure is described above in terms of various exemplary embodiments and implementations, it should be understood that the various features, aspects, and functionality described in one or more of the individual embodiments are not limited in their applicability to the particular embodiment with which they are described, but instead can be applied, alone or in various combinations to one or more of the embodiments of the disclosure.

It is therefore understood that numerous modifications which have not been exemplified can be devised without departing from the scope of the present disclosure. For example, at least one of the constituent components may be modified, added, or eliminated. At least one of the constituent components mentioned in at least one of the preferred embodiments may be selected and combined with the constituent components mentioned in another preferred embodiment.

DESCRIPTION OF THE REFERENCE
CHARACTERS

1 infrared transmission lens
2 infrared imaging element
3 signal processing unit
4 optical characteristics correction unit
5 optical member non-image-formation information storage unit
6 temperature measurement unit
7 reference temperature detection unit
8 mechanical shutter
9 temperature influence calculation unit
10 output influence calculation coefficient storage unit
12 pixel area
21 level stabilization representative point extraction unit
22 luminance value adjustment unit
23 temperature detection target deriving unit
100 pixel portion
101 reading circuit
102 drive line selecting circuit
103 signal output end
200 drive line wire
201 hollow support leg wire
202 temperature detection unit
203 signal line wire
204 substrate
205 hollow heat insulation structure
206 thermoelectric conversion mechanism
300 hardware
301 processor
302 storage device

The invention claimed is:

1. An infrared imaging device comprising:
an infrared transmission lens configured to collect infrared light emitted from an object;

an infrared imaging element having a screen in which pixels for converting the infrared light collected by the infrared transmission lens to electric signals are arranged in a two-dimensional array;

a signal processor configured to convert the electric signals from the infrared imaging element to digital signals;

an optical characteristics corrector connected downstream from the signal processor, the optical characteristics corrector being configured to perform optical characteristics correction for an output of the signal processor on the basis of a dispersion degree set in advance for the infrared transmission lens;

a reference temperature detector configured to detect a reference temperature; and a temperature measurer connected downstream from the optical characteristics corrector and the reference temperature detector, the temperature measurer being configured to perform absolute temperature conversion for the object on the basis of an output of the optical characteristics corrector and an output of the reference temperature detector.

2. The infrared imaging device according to claim 1, wherein the optical characteristics corrector is configured to perform the optical characteristics correction on the basis of a value obtained by multiplying, by a proportionality constant, a difference value between the output of the signal processor and an output obtained by multiplying the output of the signal processor by the dispersion degree of the infrared transmission lens.

3. The infrared imaging device according to claim 2, wherein a shutter mechanism is provided in front of the infrared transmission lens, the reference temperature detector is configured to measure a temperature of the shutter mechanism, and the measured temperature is configured to be applied to calculation in the temperature measurer.

4. The infrared imaging device according to claim 2, further comprising a temperature detection target deriving circuitry configured to limit a temperature measurement part from the screen of the infrared imaging element, wherein the optical characteristics corrector is configured to take, as a calculation target, a representative point limited by the temperature detection target deriving circuitry.

5. The infrared imaging device according to claim 2, further comprising:

a level stabilization representative point extractor connected downstream from the temperature measurer, the level stabilization representative point extractor being configured to extract a pixel at which variation of an output value is smaller than a threshold; and a luminance value adjustor connected downstream from the level stabilization representative point extractor, the luminance value adjustor being configured to extract configured to adjust a luminance value of the pixel on the basis of an output of the level stabilization representative point extractor, wherein the optical characteristics corrector is configured to perform output value correction for the output of the signal processor, including outputs of the level stabilization representative point extractor and the luminance value adjustor.

6. The infrared imaging device according to claim 2, further comprising:

an output influence calculation coefficient storage configured to store output shift tendency with respect to the reference temperature; and a temperature influence calculator connected downstream from the output influence calculation coefficient storage and the signal processor, the temperature influence calculator being configured to perform correction calculation for the output of the reference temperature detector on the basis of the output shift tendency.

7. The infrared imaging device according to claim 2, wherein the reference temperature is a temperature of the infrared imaging element configured to be measured by the reference temperature detector.

8. The infrared imaging device according to claim 1, wherein a shutter mechanism is provided in front of the infrared transmission lens, the reference temperature detector is configured to measure a temperature of the shutter mechanism, and the measured temperature of the shutter mechanism is applied to calculation in the temperature measurer.

9. The infrared imaging device according to claim 1, further comprising a temperature detection target deriving circuitry configured to limit a temperature measurement part from the screen of the infrared imaging element, wherein the optical characteristics corrector is configured to take, as a calculation target, a representative point limited by the temperature detection target deriving circuitry.

10. The infrared imaging device according to claim 1, further comprising:

a level stabilization representative point extractor connected downstream from the temperature measurer, the level stabilization representative point extractor being configured to extract a pixel at which variation of an output value is smaller than a threshold; and a luminance value adjustor connected downstream from the level stabilization representative point extractor, the luminance value adjustor being configured to extract configured to adjust a luminance value of the pixel on the basis of an output of the level stabilization representative point extractor, wherein the optical characteristics corrector is configured to perform output value correction for the output of the signal processor, including outputs of the level stabilization representative point extractor and the luminance value adjustor.

11. The infrared imaging device according to claim 1, further comprising:

an output influence calculation coefficient storage configured to store output shift tendency with respect to the reference temperature; and a temperature influence calculator connected downstream from the output influence calculation coefficient storage and the signal processor, the temperature influence calculator being configured to perform correction calculation for the output of the reference temperature detector on the basis of the output shift tendency.

12. The infrared imaging device according to claim 1, wherein the reference temperature is a temperature of the infrared imaging element configured to be measured by the reference temperature detector.

* * * * *